(12) United States Patent
Maltz et al.

(10) Patent No.: US 8,659,799 B2
(45) Date of Patent: Feb. 25, 2014

(54) IR SPECIALTY IMAGING METHODS AND SYSTEMS

(75) Inventors: Martin S. Maltz, Rochester, NY (US);
Reiner Eschbach, Webster, NY (US);
Martin E. Hoover, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 321 days.

(21) Appl. No.: 13/034,867

(22) Filed: Feb. 25, 2011

(65) Prior Publication Data
US 2012/0218608 A1 Aug. 30, 2012

(51) Int. Cl.
*H04N 1/40* (2006.01)
*G06K 9/00* (2006.01)
*G06K 7/10* (2006.01)

(52) U.S. Cl.
USPC ........... 358/3.28; 358/1.9; 358/2.1; 358/1.15; 358/515; 382/100; 382/135; 382/165; 235/454; 235/462.01

(58) Field of Classification Search
None
See application file for complete search history.

(56) References Cited

U.S. PATENT DOCUMENTS

| 5,286,286 | A | 2/1994 | Winnik et al. |
| 5,734,752 | A | 3/1998 | Knox |
| 6,763,123 | B2 * | 7/2004 | Reed et al. ............... 382/100 |
| 7,852,515 | B2 | 12/2010 | Eschbach et al. |
| 8,310,728 | B2 * | 11/2012 | Koyatsu et al. .............. 358/3.24 |
| 2007/0017990 | A1 | 1/2007 | Katsurabayashi |
| 2009/0021784 | A1 * | 1/2009 | Hoshii et al. ................. 358/1.15 |
| 2009/0262400 | A1 * | 10/2009 | Eschbach et al. ............ 358/3.28 |
| 2010/0214595 | A1 | 8/2010 | Chapman et al. |

OTHER PUBLICATIONS

U.S. Appl. No. 12/957,590, filed Dec. 1, 2010, Maltz et al.
U.S. Appl. No. 12/627,163, filed Nov. 30, 2009, Zhao et al.

* cited by examiner

*Primary Examiner* — Steven Kau
(74) *Attorney, Agent, or Firm* — Fay Sharpe LLP

(57) ABSTRACT

Disclosed are methods and systems of printing an image encoded with an IR watermark on a substrate. According to an exemplary method, an effective gamut is used to render the image, wherein the effective gamut is formed by the intersection of a first and second gamut associated with producing a constant IR response.

19 Claims, 8 Drawing Sheets
(1 of 8 Drawing Sheet(s) Filed in Color)

IR SPECIALTY IMAGING METHODS AND SYSTEMS

CROSS REFERENCE TO RELATED PATENTS AND APPLICATIONS

U.S. patent application Ser. No. 12/957,590, filed Dec. 1, 2010, entitled "METHOD OF CREATING NON-PATTERNED SECURITY ELEMENTS," by Maltz et al. and U.S. patent application Ser. No. 12/627,163, filed Nov. 30, 2009, entitled "PHASE LOCKED IR ENCODING FOR PEENED 2D BARCODES," by Zhao et al. are incorporated herein by reference in their entirety.

BACKGROUND

It is desirable to have a way to provide for the detection of counterfeiting, illegal alteration, and/or copying of a document, most desirably in a manner that will provide document security and which is also applicable for digitally generated documents. It is desirable that such a solution also have minimum impact on system overhead requirements as well as minimal storage requirements in a digital processing and printing environment. Additionally, it is particularly desirable that this solution be obtained without physical modification to the printing device and without the need for costly special materials and media.

Watermarking is a common way to ensure security in digital documents. Many watermarking approaches exist with different trade-offs in cost, fragility, robustness, etc. One prior art approach is to use special ink rendering where the inks are invisible under standard illumination. These inks normally respond to light outside the visible range and thereby may be made visible. Examples of such extra-spectral techniques are UV (ultra-violet) and IR (infrared). This traditional approach is to render the encoded data with special inks that are not visible under normal light, but have strong distinguishing characteristics under the special spectral illumination. Determination of the presence or absence of such encoding may be thereby subsequently performed using an appropriate light source and detector. One example of this approach is found in U.S. Patent Application No. 2007/0017990 to Katsurabayashi et al., which is herein incorporated by reference in its entirety for its teachings. However, these special inks and materials are often difficult to incorporate into standard electro-photographic or other non-impact printing systems like solid ink printers, either due to cost, availability or physical/chemical properties. This in turn discourages their use in variable data printing arrangements, such as for redeemable coupons or other personalized printed media for example.

Another approach is to use ultra-violet (UV) ink rendering, to encode a watermark that is not visible under normal illumination, but revealed under UV illumination. The traditional approach, often used in currency notes, is to render a watermark with special ultra-violet (UV) fluorescent inks and to subsequently identify the presence or absence of the watermark in a proffered document using a standard UV lamp. One example of this approach may be found in U.S. Pat. No. 5,286,286 to Winnik et al., which is herein incorporated by reference in its entirety for its teachings. However, these inks are costly to employ, and thus are typically only economically viable in offset printing scenarios, and thus only truly avail themselves of long print runs. Additionally, these materials are often difficult to incorporate into standard electro-photographic or other non-impact printing systems like solid ink printers, either due to cost, availability or physical/chemical properties. This in turn discourages their use in variable data printing arrangements, such as for redeemable coupons, for but one example.

Another approach taken to provide a document for which copy control is provided by digital watermarking includes as an example U.S. Pat. No. 5,734,752 to Knox, where there is illustrated a method for generating watermarks in a digitally reproducible document which are substantially invisible when viewed including the steps of: (1) producing a first stochastic screen pattern suitable for reproducing a gray image on a document; (2) deriving at least one stochastic screen description that is related to said first pattern; (3) producing a document containing the first stochastic screen; (4) producing a second document containing one or more of the stochastic screens in combination, whereby upon placing the first and second document in superposition relationship to allow viewing of both documents together, correlation between the first stochastic pattern on each document occurs everywhere within the documents where the first screen is used, and correlation does not occur where the area where the derived stochastic screens occur and the image placed therein using the derived stochastic screens becomes visible.

INCORPORATION BY REFERENCE

U.S. Patent Application Publication No. 2007/0017990, published Jan. 25, 2007, entitled "DOCUMENT CORRECTION DETECTION SYSTEM AND DOCUMENT TAMPERING PREVENTION SYSTEM," by Katsurabayashi;

U.S. Pat. No. 7,852,515 issued 14 Dec. 2010, entitled "INFRARED ENCODING FOR EMBEDDING MULTIPLE VARIABLE DATA INFORMATION COLLOCATED IN PRINTED DOCUMENTS," by Eschbach et al.;

U.S. Patent Application Publication No. 2009/0262400, published Oct. 22, 2009, entitled "INFRARED WATERMARKING OF PHOTOGRAPHIC IMAGES BY MATCHED DIFFERENTIAL BLACK STRATEGIES," by Eschbach et al., U.S. Patent Application Publication No. 2010/0214595, published Aug. 26, 2010, entitled "METHOD AND APPARATUS FOR USING PATTERN COLOR SPACE IN PRINT JOB PROCESSING," by Chapman et al.;

U.S. Pat. No. 5,286,286, issued Feb. 15, 1994, entitled "COLORLESS FAST-DRYING INK COMPOSITIONS FOR PRINTING CONCEALED IMAGES DETECTABLE BY FLUORESCENCE," by Winnik et al.; and U.S. Pat. No. 5,734,752, issued Mar. 31, 1998, entitled "DIGITAL WATERMARKING USING STOCHASTIC SCREEN PATTERNS," by Knox, are incorporated herein by reference in their entirety.

BRIEF DESCRIPTION

In one embodiment of this disclosure, described is a method of printing an image encoded with an IR watermark on a substrate associated with a printing device including a plurality of colorants, the method comprising: a) generating a first device dependent multidimensional color space representation of the printing device using a first constant value of one or more of the plurality of colorants, the first device dependent multidimensional color space representation defining a first gamut associated with the printing device; b) generating a second device dependent multidimensional color space representation of the printing device using a second constant value of one or more of the plurality of colorants offset from the first constant value of one or more of the plurality of colorants, the second device dependent multidimensional color space representation defining a second gamut associated with the printing device; c) defining an effective gamut associated with the printing device formed by the intersection of the first gamut and second gamut; d) defining a third device dependent multidimensional color space representation of the printing device including only the first device dependent multidimensional color space representation of the printing device using the first constant value of one or more of the plurality of colorants within the effective gamut; e) defining a fourth device dependent multidimensional color space representation of the printing device including only the second device dependent multidimensional color space representation of the printing device using a second constant value of one or more of the plurality of colorants within the effective gamut; f) generating a device dependent multidimensional color space representation of the image encoded with the watermark by encoding the watermark using a metameric pair of device dependent multidimensional color space representations of the image color associated with the watermark location, the metameric pair including a first metamer of the image color derived from the third device dependent multidimensional color space representation of the printing device and a second metamer of the image color derived from the fourth device dependent multidimensional color space representation of the printing device; and g) printing the device dependent multidimensional color space representation of the image encoded with the watermark on the substrate using the associated printing device.

In another embodiment of this disclosure, described is a printing system comprising: a printing device including a plurality of colorants, the printing device configured to receive device dependent data representative of an image encoded with an IR watermark and the printing device configured to print the image encoded with the IR watermark on a substrate; and a controller operatively connected to the printing device, the controller configured to execute controller readable instructions to perform a method of printing an image encoded with an IR watermark on a substrate operatively associated with the printing device, the method comprising: a) generating a device dependent multidimensional color space representation of the image encoded with the watermark; and b) printing the device dependent multidimensional color space representation of the image encoded with the watermark on the substrate, wherein the device dependent multidimensional color space representation of the image encoded with the watermark is generated by a method comprising: aa) generating a first device dependent multidimensional color space representation of the printing device using a first constant value of one or more of the plurality of colorants, the first device dependent multidimensional color space representation defining a first gamut associated with the printing device; bb) generating a second device dependent multidimensional color space representation of the printing device using a second constant value of one or more of the plurality of colorants offset from the first constant value of one or more of the plurality of colorants, the second device dependent multidimensional color space representation defining a second gamut associated with the printing device; cc) defining an effective gamut associated with the printing device formed by the intersection of the first gamut and second gamut; dd) defining a third device dependent multidimensional color space representation of the printing device including only the first device dependent multidimensional color space representation of the printing device using the first constant value of one or more of the plurality of colorants within the effective gamut; ee) defining a fourth device dependent multidimensional color space representation of the printing device including only the second device dependent multidimensional color space representation of the printing device using a second constant value of one or more of the plurality of colorants within the effective gamut; and ff) generating the device dependent multidimensional color space representation of the image encoded with the watermark by encoding the watermark using a metameric pair of device dependent multidimensional color space representations of the image color associated with the watermark location, the metameric pair including a first metamer of the image color derived from the third device dependent multidimensional color space representation of the printing device and a second metamer of the image color derived from the fourth device dependent multidimensional color space representation of the printing device.

In still another embodiment of this disclosure, described is a method of printing a first image not encoded with an IR watermark on a substrate, and printing a second image encoded with the IR watermark on the substrate, the substrate associated with a printing device including a plurality of colorants, the method comprising: a) generating a device dependent multidimensional color space representation of the first image not encoded with the watermark within a first gamut associated with the printing device; b) generating a device dependent multidimensional color space representation of the second image encoded with the IR watermark within a second gamut associated with the printing device, the second gamut a subset of the first gamut; and c) printing the device dependent multidimensional color space representation of the first image and second image on a common substrate, wherein step b) includes: aa) generating a first device dependent multidimensional color space representation of the printing device using a first constant value of one or more of the plurality of colorants, the first device dependent multidimensional color space representation defining a first gamut associated with the printing device; bb) generating a second device dependent multidimensional color space representation of the printing device using a second constant value of one or more of the plurality of colorants offset from the first constant value of one or more of the plurality of colorants, the second device dependent multidimensional color space representation defining a second gamut associated with the printing device; cc) defining an effective gamut associated with the printing device formed by the intersection of the first gamut and second gamut; dd) defining a third device dependent multidimensional color space representation of the printing device including only the first device dependent multidimensional color space representation of the printing device using the first constant value of one or more of the plurality of colorants within the effective gamut; ee) defining a fourth device dependent multidimensional color space representation of the printing device including only the second device dependent multidimensional color space representation of the printing device using a second constant value of one or more of the plurality of colorants within the effective gamut; and ff) generating the device dependent multidimensional color space representation of the image encoded with the watermark by encoding the watermark using a metameric pair of device dependent multidimensional color space representations of the image color associated with the watermark location, the metameric pair including a first metamer of the image color derived from the third device dependent multidimensional color space representation of the printing device and a second metamer of the image color derived from the fourth device dependent multidimensional color space representation of the printing device.

BRIEF DESCRIPTION OF THE DRAWINGS

The file of this patent contains at least one drawing executed in color. Copies of this patent with color drawing(s)

will be provided by the Patent and Trademark Office upon request and payment of the necessary fee.

DETAILED DESCRIPTION

Figure 1:
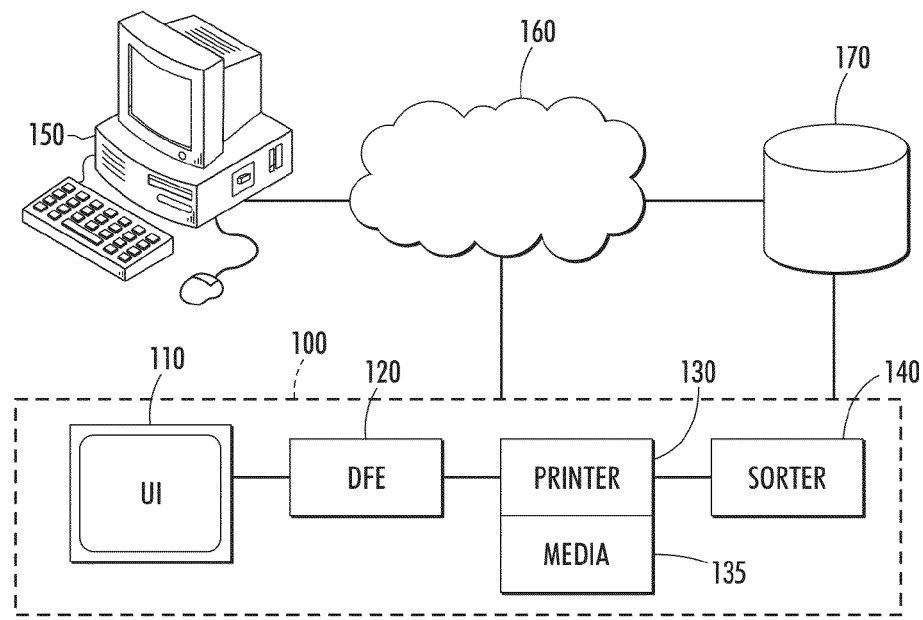
FIG. 1 is a block diagram of a printing system suitable for implementing one or more aspects of the exemplary method described herein.

For a general understanding of the present disclosure, reference is made to the drawings. In the drawings, like reference numerals have been used throughout to designate identical elements. In describing the present disclosure, the following term(s) have been used in the description.

The term "data" refers herein to physical signals that indicate or include information. An "image", as a pattern of physical light or a collection of data representing said physical light, may include characters, words, and text as well as other features such as graphics. A "digital image" is by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably. In the event that one term or the other is deemed to be narrower or broader than the other, the teaching as provided herein and claimed below is directed to the more broadly determined definitional term, unless that term is otherwise specifically limited within the claim itself.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation performs "image processing" when it operates on an item of data that relates to part of an image. "Contrast" is used to denote the visual difference between items, data points, and the like. It can be measured as a color difference or as a luminance difference or both. A digital color printing system is an apparatus arrangement suited to accepting image data and rendering that image data upon a substrate.

For the purposes of clarity for what follows, the following additional term definitions are herein provided:

Colorant: A dye, pigment, ink, or other agent used to impart a color to a material. Colorants, such as most colored toners, impart color by altering the spectral power distribution of the light they receive from the incident illumination through two primary physical phenomenon: absorption and scattering. Color is produced by spectrally selective absorption and scattering of the incident light, while allowing for transmission/reflection of the remaining light. For example, cyan, magenta and yellow colorants selectively absorb long, medium, and short wavelengths respectively in the spectral regions. Some colorants impart color in transmissive mode. Other suitable colorants may operate in a reflective mode. Some colorants are dye-based, other colorants are pigment-based. For the purposes of discussion in this specification but not to be limited to same, colorant will be taken to be one of the fundamental subtractive C, M, Y, K, primaries, (cyan, magenta, yellow, and black)—which may be realized in formulation as, liquid ink, solid ink, dye, or electrostatographic toner.

For the purpose of this application, it is understood that a metameric rendering requires four or more colorants. The restriction to four colorants in the text is for simplicity of description and not intended to limit the disclosure. For example, it is well understood that a five or more colorant system has a larger possible set of metameric colors and thus has, in general, a larger set of colorant mixtures that can be selected for the infrared watermarking. It is also is well understood that in a four colorant system only one colorant can be independently fixed or determined, but in a five or more colorant systems more than one colorant can in general be fixed. It is also well understood that in a multicolorant system, certain colors can only be reached by using a single—or small group—of colorants and that those colors in general do not lead themselves to metameric rendering as described in this application.

Colorant mixture: a particular combination of C, M, Y, K colorants.

In the context of this application, it is understood that a metameric pair is a pair of colorant mixtures that results in the equivalent human visual response. In real world scenarios, this match will always be approximate and it is only important to create a match within the useful boundaries of the application. Colorimetric differences as well as differences created by distracting colors, etc., are, for the purpose of this application, assumed to be known and are described, for example in above cited U.S. Pat. No. 7,852,515. In the context of this application it is also understood that the term colorant refers to a visual attribute and thus excludes infrared material that is otherwise invisible to the human eye, as it is the common approach in traditional IR encoding.

With reference now to FIG. 1, a printing system or image rendering system 100 suitable for implementing aspects of the exemplary embodiments described herein is illustrated. The word "printer" and the term "printing system" as used herein encompass any apparatus and/or system, such as a digital copier, xerographic and reprographic printing systems, bookmaking machine, facsimile machine, multi-function machine, ink-jet machine, continuous feed, sheet-fed printing device, etc. which may contain a print controller and a print engine and which may perform a print outputting function for any purpose.

The printing system 100 generally includes a user interface 110, a digital front end (DFE) controller 120, and at least one print engine 130. The print engine 130 has access to print media 135 of various sizes, properties and cost for a print job. A "print job" or "document" is normally a set of related sheets, usually one or more collated copy sets copied from a set of original print job sheets or electronic document page images, from a particular user, or otherwise related. For submission of a regular print job, digital data is generally sent to the printing system 100. A sorter 140 operates after a job is printed by the print engine 130 to manage arrangement of the hard copy output, including cutting functions. A user can access and operate the printing system 100 using the user interface 110 or via a workstation 150. The workstation 150 communicates with the printing system 100 via a communications network 160. A user profile, a work product for printing, a media library, and various print job parameters can be stored in a database or memory 170 accessible by the workstation 150 or the printing system 100 via the network 160, or such data can be directly accessed via the printing system 100. One or more color sensors (not shown) may be embedded in the printer paper path, as known in the art.

Figure 2:
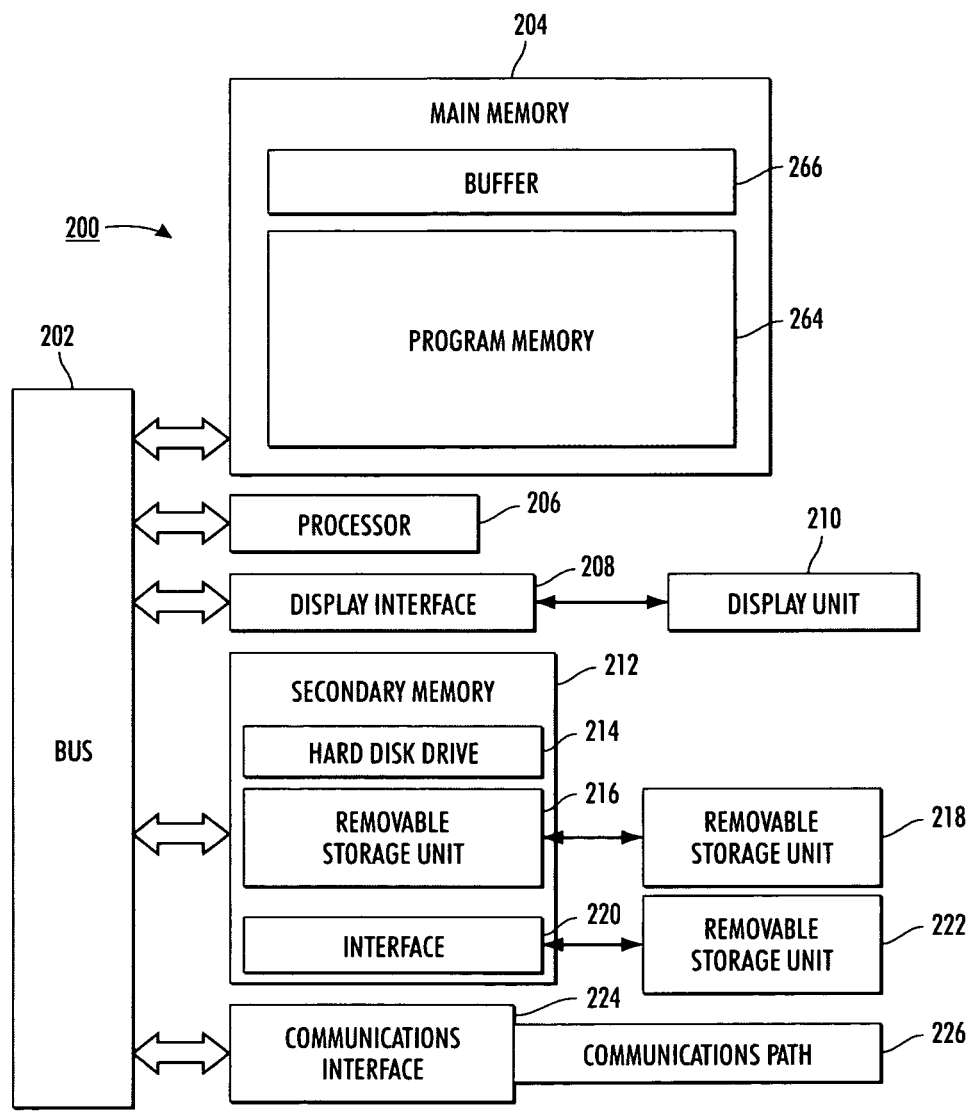
FIG. 2 is a block diagram of a DFE controller useful for implementing one or more aspects of the exemplary method described herein.

Turning now to FIG. 2, an exemplary DFE controller 200 is shown in greater detail. The DFE 200 includes one or more processors, such as processor 206 capable of executing machine executable program instructions. In the embodiment shown, the processor is in communication with a bus 202 (e.g., a backplane interface bus, cross-over bar, or data network). The DFE 200 also includes a main memory 204 that is used to store machine readable instructions. The main memory also being capable of storing data. Main memory may alternatively include random access memory (RAM) to support reprogramming and flexible data storage. Buffer 266 is used to temporarily store data for access by the processor. Program memory 264 includes, for example, executable programs that implement the embodiments of the methods described herein. The program memory 264 stores at least a subset of the data contained in the buffer.

The DFE 200 includes a display interface 208 that forwards data from communication bus 202 or from a frame buffer (not shown) to a display 210. The DFE 200 also includes a secondary memory 212 including, for example, a hard disk drive 214 and/or a removable storage drive 216, which reads and writes to removable storage 218, such as a floppy disk, magnetic tape, optical disk, etc., that stores computer software and/or data. The secondary memory 212 alternatively includes other similar mechanisms for allowing computer programs or other instructions to be loaded into the computer system. Such mechanisms include, for example, a removable storage unit 222 adapted to exchange data through interface 220. Examples of such mechanisms include a program cartridge and cartridge interface, such as that found in video game devices, a removable memory chip, such as an EPROM, or PROM, and associated socket, and other removable units and interfaces which allow software and data to be transferred.

The DFE 200 includes a communications interface 224, which acts as both an input and an output to allow software and data to be transferred between the DFE 200 and external devices. Examples of a communications interface include a modem, a network interface, such as an Ethernet card, a communications port, a PCMCIA slot and card, etc.

Computer programs (also called computer control logic) may be stored in main memory 204 and/or secondary memory 212. Computer programs may also be received via a communications interface 224. Such computer programs, when executed, enable the computer system to perform the features and capabilities provided herein. Software and data transferred via the communications interface can be in the form of signals which may be, for example, electronic, electromagnetic, optical, or other signals capable of being received by a communications interface. These signals are provided to a communications interface via a communications path (i.e., channel) which carries signals and may be implemented using wire, cable, fiber optic, phone line, cellular link, RF, or other communications channels.

Part of the data generally stored in secondary memory 212 for access during DFE operation is a set of translation tables that convert an incoming color signal into a physical machine signal. In our case, this color signal can be expressed either as a colorimetric value, usually three components as L*a*b*, RGB, XYZ, etc. or as a idealized device description, usually SWOP CMYK, GRACoL CMYK etc. into physical exposure signals for the four toners cyan, magenta, yellow and black. These tables are commonly created outside of the DFE and downloaded, but are optionally created inside the DFE in a so-called characterization step.

Previously known methods and systems that generate IR encoding using metametric rendering of a "color" are not useable for some IR barcode readers because of the reader's automatic gain and offset control. This disclosure describes methods and systems that overcome this problem by creating a constant IR response system that allows the use of arbitrary images in barcode applications. According to an exemplary method, the method first creates an ICC profile where the K-component is forced to be 0 (i.e. switch off UCR/GCR). Second, an ICC profile that has a constant K amount (e.g. K=60 out of 255) is generated. The method then restricts colors to the intersection of the two gamuts. Barcode creation is then performed by painting the background with the image through one of the ICC profiles and subsequently printing the barcode using the identical image through the other profile. Barcodes generated with the disclosed method can be easily read by a barcode reader including an automatic gain and offset control. Furthermore, prints are visually pleasing and IQ (Image Quality) artifacts are not objectionable. In other words, there is no visual difference between the high K and low K rendering of the images when held side-by-side. The implementation is straightforward in PostScript or VIPP. Using "constant K" ICC profiles and the absolute intersection of the two profiles to create constant IR encoding is new.

In several printing applications, e.g.: PhotoBooks, a barcode is required to route the book from creation to mailing. For example, in Cover Driven Workflows, the initial barcode is in the cut-off margin and there is no need for invisible/infrared barcodes. On the final step, namely the association of the finished, cut and "bound" book with an order number and shipping address, the information has to be part of the book or other document associated with the book that is sent to the customer. In these cases, it is desirable to have an invisible mark, especially in high-value items as PhotoBooks. At the same time, the look and feel of the PhotoBook should be pleasing. According to this disclosure, and exemplary embodiments contained herein, methods to create a constant IR response system are disclosed. The disclosed methods and systems allow the use of arbitrary images rendered into a reduce gamut space for example, but not limited to, barcode applications.

Previously, InfraRed encoding could be obtained by alternating between different metameric renderings of a "color". Two main approaches existed, one for human-readable versions, and one for machine-readable versions. The main difference between them being that the human readable form had the largest flexibility in colors, but a color-dependent IR contrast, whereas the machine-readable form had constant IR contrast as required by the barcode reader, but essentially single color graphics, i.e.: no graphical designs or images could be used.

Figure 3:
FIG. 3 shows the infrared watermarking of an image showing the varying IR contrast in different regions of the image.

FIG. 3 shows the previous capability, along with the problem that is created for automatic barcode reading. In FIG. 3, the text string "XEROX InfraRed" is easily visible to the human eye.

Unfortunately, this method is not usable for common industry standard IR barcode readers. Readers work with an automatic gain and offset control that is built into the device and the optimal visibility achievable for human-readable scenarios is based on the human ability to locally adjust the perceived contrast.

Barcode scanners include adaptive exposure control settings and it is possible to follow the optical signal at different stages of the processing. Assuming that no scanner modification can be performed as with off-the-shelf system, it can be seen how, in general, the processing is performed in such systems. Note that it is not important to understand the exact form of the exposure control, rather it is only important to see it work on current IR encoding. Additionally, different "print weight" settings allow the overall exposure to be moved up or down. Again, this does not influence the overall behavior of the system to IR encoding.

Figure 4:
FIG. 4 shows IR data sent to the decoding circuitry of a handheld IR-barcode scanner, the IR data associated with the image shown in FIG. 3.

FIG. 4 shows how the image of FIG. 3 looks to the data input for a standard barcode scanner where the scan data is intercepted at the last step before it enters the decoding unit.

FIG. 4 shows the problem of high contrast IR encoding, where in different parts of color space, different IR contrasts can be achieved and to a human, this results in a good readability of the IR encoded data throughout the image. The human visual system uses the local contrast to define the character boundary and readability.

Any scanner, digital camera or other common image sensor relying on a global exposure control algorithm will not be able perform the necessary adjustments. Thus, any device used in machine reading will not be able to create a reliable signal from the current IR encoding.

In the past, the only way to circumvent this problem was through the use of "constant color patches", as described in U.S. patent application Ser. No. 12/627,163, filed Nov. 30, 2009, entitled "PHASE LOCKED IR ENCODING FOR PEENED 2D BARCODES," by Zhao et al.

However, these patches give little design freedom and are clearly "not desired" in several applications, among them the high value PhotoBook applications.

Now described are method systems to circumvent the above described problems by using a different approach to the creation of two related ICC profiles that have a common K-offset among them.

Creating Fixed Contrast ICC Profiles

The first step in the disclosed method is the definition of a constant IR contrast. Past experiments have indicated that the IR contrast is determined to the largest extend by the K-component and that the other components are smaller contributors, with cyan second. For the following examples, we ignore the contributions of the other colorants, but it is clear that the contributions can be included in the following description.

Created now is an ICC profile where the K-component is forced to be 0, meaning that the no gray component replacement (GCR) is used. Second, an ICC profile is created that has a constant K amount, say K=60 where 255 is the maximum amount.

Figure 5:
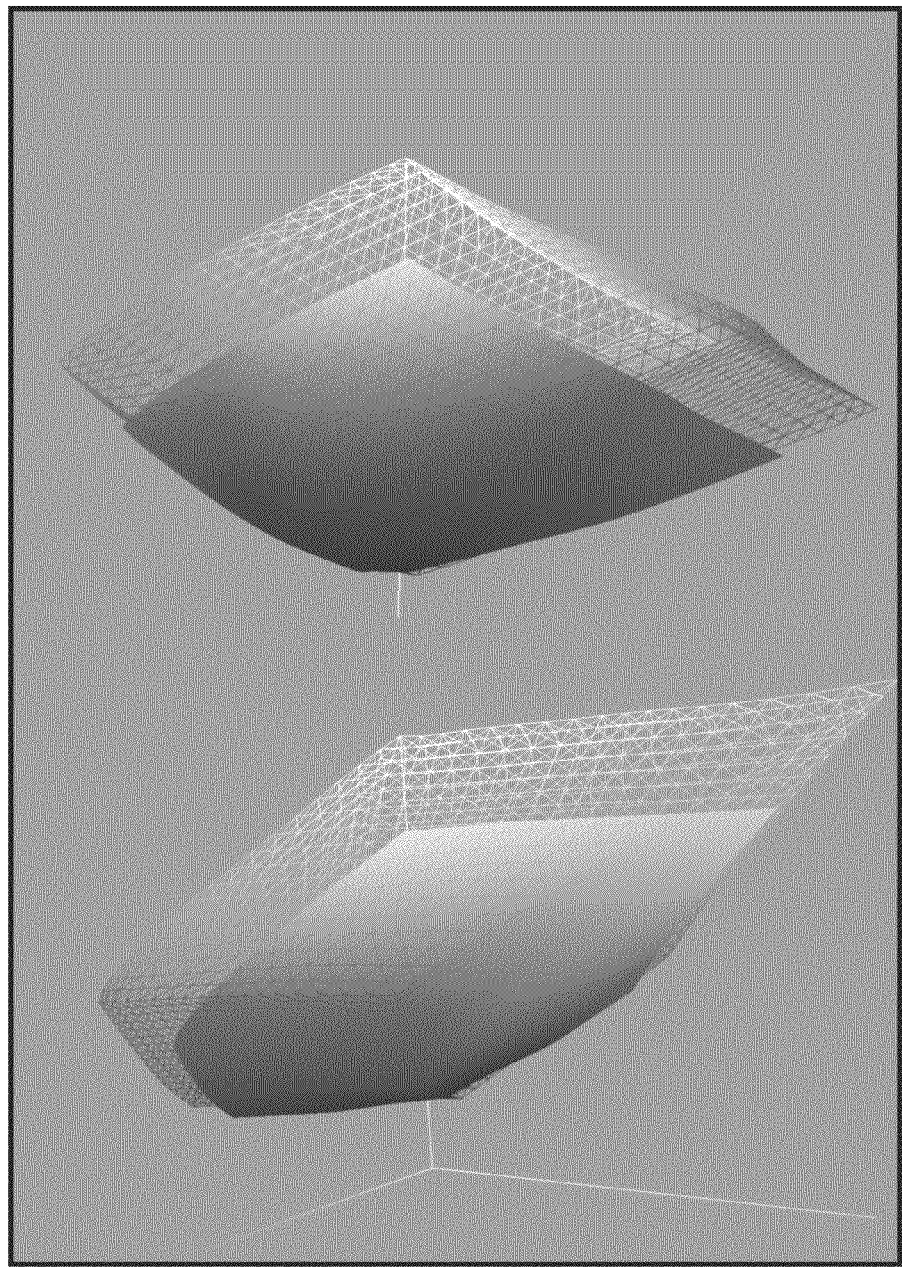
FIG. 5 shows two views of two different comston HK ICC profiles.

FIG. 5 shows the color gamuts for two ICC profiles for an exemplary printing system, the wireframe showing the K=0 profile and the solid showing the K=60 profile.

It is important to note, that no "white adjustment" is made, the actual "whitest" point of the second profile is at a K value of 60, thus at a mid-gray. Also, no black point adjustment is made to either profile. Thus, the two profiles have large non-overlapping regions in absolute color space. It should be noted that the blackest black of either gamut is lighter than the actual best black achievable on the printer, other than the coincidental case where the best black can be created at exactly the chosen K value by accident.

Constant K profiles are new, since K is normally an outcome of the calibration and not an input, with exception of the trivial case of K=0 for a three color printer.

Common ICC Profile Space for Barcode Embedding

The two gamuts shown in FIG. 5 are combined into a single gamut by using the intersection of the two gamuts. Again, an unconventional operation caused by the barcode scanner requirements. The resultant gamut then spans colors that are never all the way white, or any primary or secondary color, nor ever all the way black. Consequently, any image rendered through this gamut will have a strongly reduced color range, however, the color range is still very useful, even for general images. In other words, there is no visual difference between the high K and low K rendering of the images when held side-by-side.

Note that at this stage there are two ICC profiles, one at K=0 and one at K=60, that have a complete overlap, i.e. all non-overlapping parts have been pruned. One of the profiles is used as a background profile where the barcode is "white" and one of the profiles is used as a foreground profile where the barcode is "black". Rendering an image through either of the two profiles results in an identical visual image with absolute color transformation in the profile creation. However, under IR, one of the renderings will be "white" with maximum IR reflectance and one will be "dark" with reduced IR reflection through K=60 carbon toner absorption.

Barcode Creation

Barcode creation is now done by painting the background with the image though one of the ICC profiles, and subsequently printing the barcode using the identical image through the other profile. Which profile high or low K, is used as foreground or background can freely be chose based on other attributes such as toner amount, machine specifications, etc. since barcode readers handle both polarities of a barcode signal.

In terms of PostScript and VIPP, this is a straightforward operation in which a background image is rendered and subsequently a "barcode" matrix is printed over that background image, with a color that is visually identical to the color of the background pixel. Thus the visual impression is not altered, but the image has a different colorant combination with a fixed infrared contrast.

Experimental Verification

The proposed method was tested on a set of randomly chosen images with the intent to define failure modes. The most important failure mode is the inability to decode the embedded barcodes. A second, less important, failure mode is that the two ICC profiles, albeit being intended to be identical ($\Delta E=0$) nevertheless have a finite visual difference since color models are not always precise for variations in the K strategy.

Figure 6:
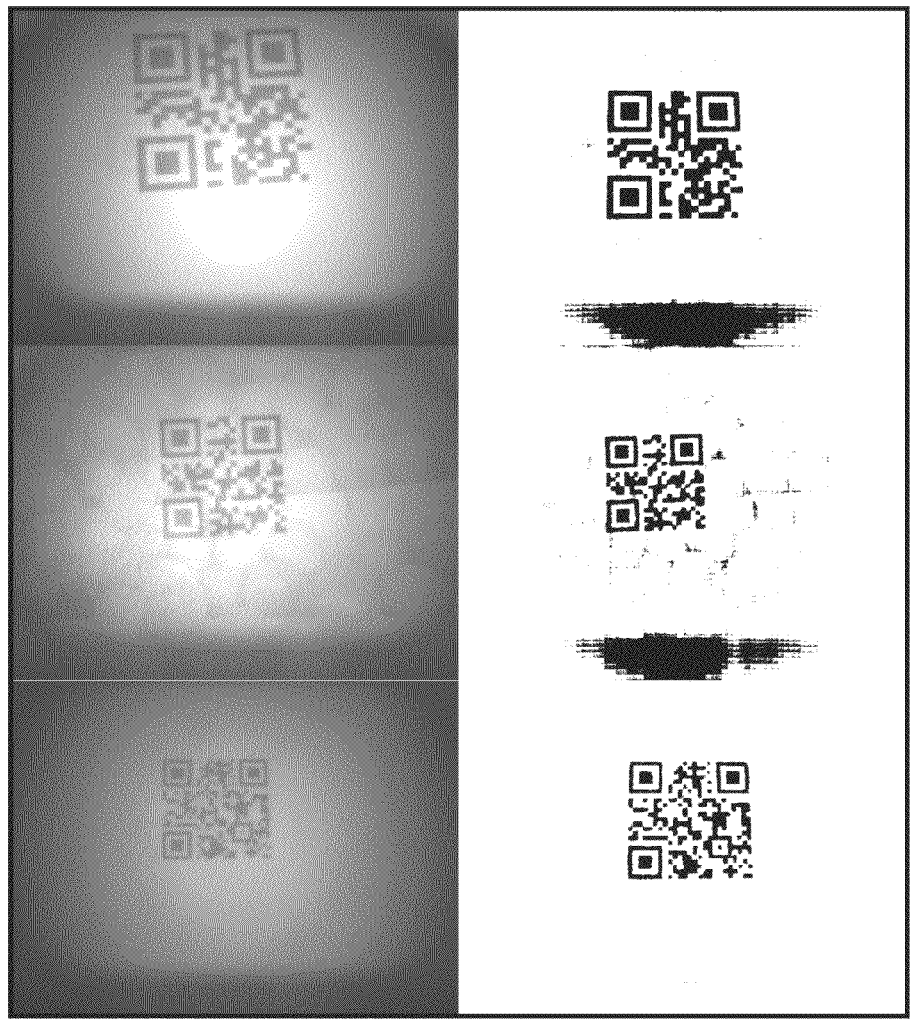
FIG. 6 shows the IR response of scanning QR barcodes embedded as infrared images inside an image according to an exemplary embodiment of this disclosure.

FIG. 6 shows the result of some experimental prints. The left side of FIG. 6 shows the graylevel reader output obtained after automatic exposure control, i.e. gain and offset control. On the right is the corresponding binary image passed to the decoder after thresholding the graylevel image. Note that the binary image is the actual barcode scanner data and that graylevel and binary capture have been done subsequently with a handheld device. Thus there is no spatial registration between the images, except for a human "aiming" at a similar spot.

FIG. 6 is a good example of the simplicity of considering the infrared absorption to be a K-only effect as it is done according to the disclosed exemplary embodiment. The noise imparted by the infrared absorption of the other toners can be seen in FIG. 6, but for the barcode recognition, this noise is below an objectionable threshold. It is well understood that the remaining infrared absorption can be considered in the creation of the ICC tables, further reducing the noise.

Exemplary Application Area

Currently, in order to match a customer order and a customer shipping address or any other information, one either needs to print a visible barcode on the item, e.g. b & w barcode, or one needs to handle an appropriate sheet with all the information that is actually carried by hand, with all the human-error related problems. For example, shipping a PhotoBook or a Birthday Card to the wrong person is a serious problem and thus order integrity is extremely important.

Furthermore, for a PhotoBook application, the image is a design element created by the publisher and not by the end-user.

Figure 7:
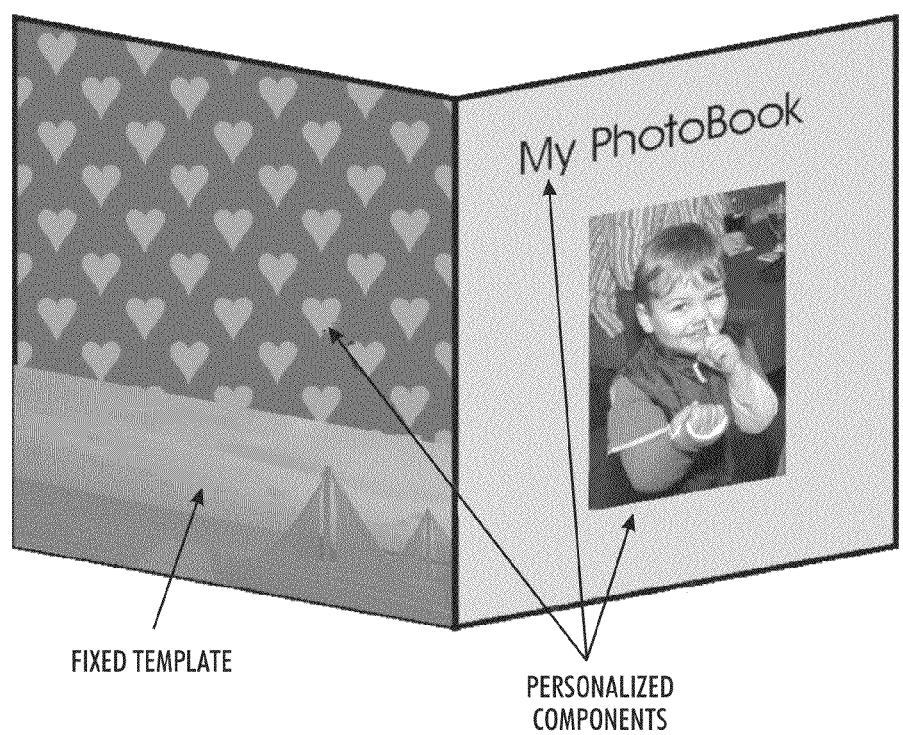
FIG. 7 shows a PhotoBook cover with freely customizable and fixed (template) components according to an exemplary embodiment of this disclosure.

The PhotoBook publisher thus might offer a handful of templates with the pre-designed visual elements. FIG. 7 shows the customizable components and the fixed components according to one exemplary embodiment of this disclosure. The customizable component includes a cover and the fixed component includes a plurality of predetermined templates. Notably, the "template" area would otherwise show an obtrusive visible barcode.

The "only" variable part of this scenario is the barcode that encodes the end-user data relevant for packaging and shipping, e.g. order number. The look of the back-cover does not change with differing barcodes, since the barcodes are "invisible" to the human eye and only detectable with a barcode scanner.

Figure 8:
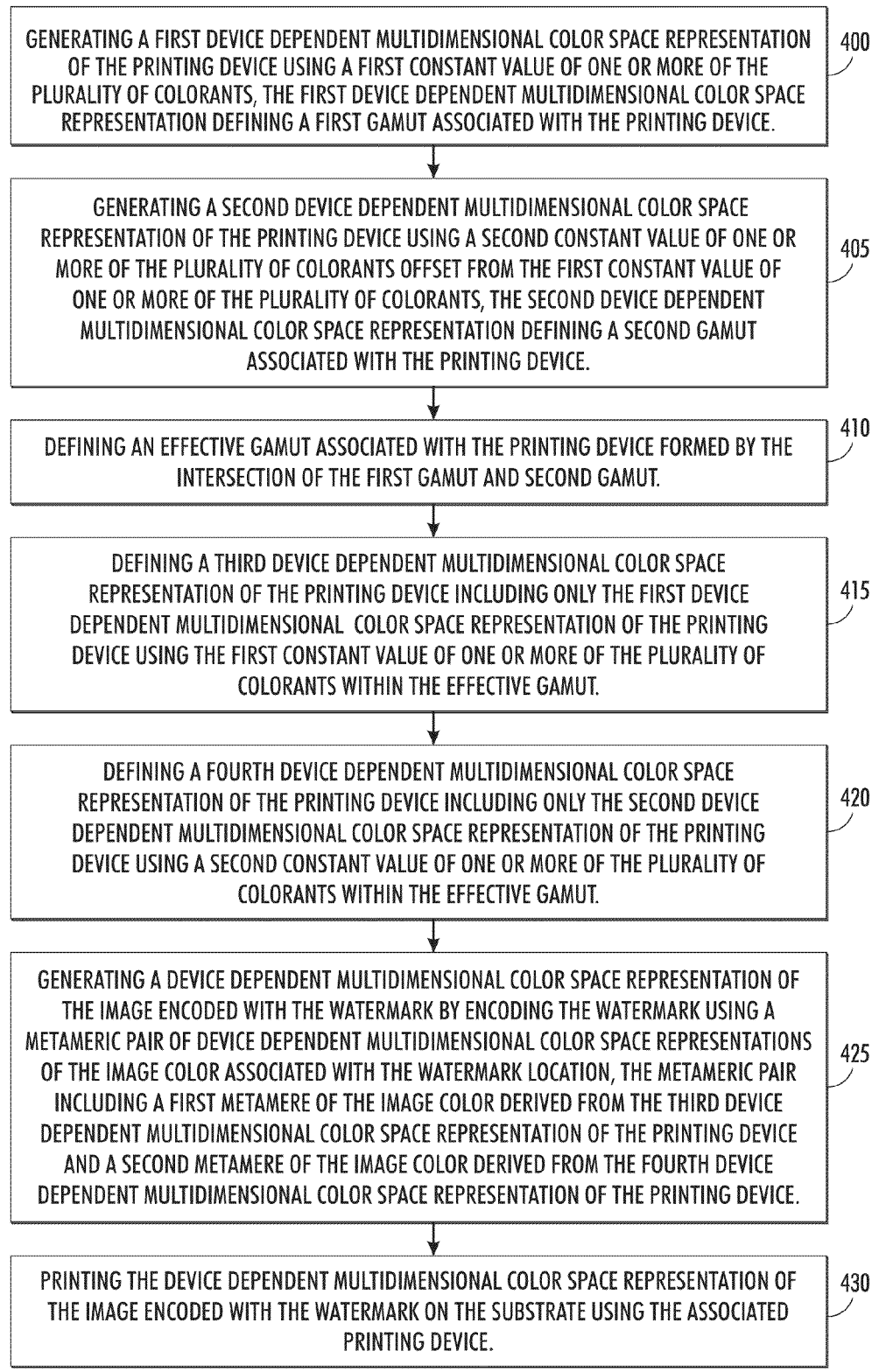
FIG. 8 shows a flow chart of an exemplary method of printing an image encoded with an IR watermark according to this disclosure.

With reference to FIG. 8, illustrated is a flow chart of a method/process of printing an image encoded with an IR watermark according to this disclosure. The image is printed on a substrate associated with a printing device and the printing device includes a plurality of colorants.

The method comprises:

a) generating a first device dependent multidimensional color space representation of the printing device using a first constant value of one or more of the plurality of colorants, the first device dependent multidimensional color space representation defining a first gamut associated with the printing device 400;

b) generating a second device dependent multidimensional color space representation of the printing device using a second constant value of one or more of the plurality of colorants offset from the first constant value of one or more of the plurality of colorants, the second device dependent multidimensional color space representation defining a second gamut associated with the printing device 405;

c) defining an effective gamut associated with the printing device formed by the intersection of the first gamut and second gamut 410;

d) defining a third device dependent multidimensional color space representation of the printing device including only the first device dependent multidimensional color space representation of the printing device using the first constant value of one or more of the plurality of colorants within the effective gamut 415;

e) defining a fourth device dependent multidimensional color space representation of the printing device including only the second device dependent multidimensional color space representation of the printing device using a second constant value of one or more of the plurality of colorants within the effective gamut 420;

f) generating a device dependent multidimensional color space representation of the image encoded with the watermark by encoding the watermark using a metameric pair of device dependent multidimensional color space representations of the image color associated with the watermark location, the metameric pair including a first metamer of the image color derived from the third device dependent multidimensional color space representation of the printing device and a second metamer of the image color derived from the fourth device dependent multidimensional color space representation of the printing device 425; and g) printing the device dependent multidimensional color space representation of the image encoded with the watermark on the substrate using the associated printing device 430.

Other features of the method illustrated in FIG. 8 may include the following:

The method of FIG. 8, wherein the first constant value of one or more of the plurality of colorants is associated with a substantially black colorant K, and the second constant value of one or more of the plurality of colorants is associated with the substantially black colorant K offset from the first constant value.

The method of FIG. 8, wherein the first constant value of one or more of the plurality of colorants is associated with a substantially black colorant K, and the second constant value of one or more of the plurality of colorants is associated with the substantially black colorant K offset from the first constant value and the first constant value of K is within the range of 0-5%, and the second constant value of K is within the range of 20-35%.

Notably, the range of the K colorant values is a trade-off between absolute white, set by the higher K value and the IR contrast set by the difference between the higher and lower K value.

The method of FIG. 8, wherein the first constant value of one or more of the plurality of colorants is associated with a substantially black colorant K, and the second constant value of one or more of the plurality of colorants is associated with the substantially black colorant K offset from the first constant value and K is associated with one of a black colorant and process black including a mixture of nonblack colorants.

The method of FIG. 8, step c) including defining an effective gamut associated with the printing device formed by the absolute intersection of the first gamut and the second gamut.

The method of FIG. 8, wherein the plurality of colorants are two or more of C (Cyan), M (Magenta), Y (Yellow), K (Black), O (Orange), V (Violet), R (Red), G (Green) and B (Blue).

The method of FIG. 8, wherein the differential IR response of the first gamut and second gamut is substantially constant.

The method of FIG. 8, wherein the IR watermark is a barcode or other machine readable code.

The method of FIG. 8, wherein the first, second, third and fourth device dependent multidimensional color space is CMYK.

The method of FIG. 8, wherein the first and second device dependent multidimensional color space representation of the printing device transform from a trichromatic color space to CMYK color space.

It is to be understood that the ICC profiles generated in steps a)-e) of FIG. 8 (i.e. steps 400-420, respectively) are preferably created before engaging a printing device to execute a print job. During the execution of a print job, the metameric coupled ICC profiles reside in the printing device and/or a controller such as an operatively connected DFE. During the execution of the print job, the printing device receives a data representation of an image and the indication of a watermark to be included in the print job. The printing device then accesses one of the resident, i.e. stored, ICC profiles to render the image as a function of the watermark. Alternatively, the printing device renders the entire image using both ICC profiles and subsequently select an area to be associated with the watermark.

It should be understood that terms such as computer program medium, computer executable medium, computer usable medium, and computer readable medium, are used herein to generally refer to media such as main memory and secondary memory, removable storage drive, a hard disk installed in a disk drive, and signals. These computer program products are means for providing instructions and/or data to the computer system. The computer readable medium stores data, instructions, messages packets, or other machine readable information. The computer readable medium, for example, may include non-volatile memory, such as a floppy, ROM, flash memory, disk memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, which allows a computer to read such computer readable information.

It should also be understood that the methods described in the flowcharts provided herewith can be implemented on the DFE, a special purpose computer, a microprocessor or microcontroller, an ASIC or other integrated circuit, a DSP, an electronic circuit such as a discrete element circuit, a programmable device such as a PLD, PLA, FPGA, PAL, PDA, and the like. In general, any device or system capable of implementing a finite state machine that is in turn capable of implementing one or more elements of the flow diagrams provided herewith, or portions thereof, can be used. It is also understood that all or parts of the DFE functionality might be separated across different physical machines or different virtual machines that are a part of a dynamic service. Portions of the flow diagrams may also be implemented partially or fully in hardware in conjunction with machine executable instructions.

Furthermore, the flow diagrams hereof may be partially or fully implemented in software using procedural or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein.

Furthermore, the article of manufacture may be included on at least one storage device readable by machine architecture or other xerographic or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately either alone or as part of an add-on, update, upgrade, or product suite.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of printing an image encoded with an IR watermark on a substrate associated with a printing device including a plurality of colorants, the method comprising:
   a) generating a first device dependent multidimensional color space representation of the printing device using a first constant value of one or more of the plurality of colorants as an input to a calibration process, the first device dependent multidimensional color space representation defining a first gamut associated with the printing device;
   b) generating a second device dependent multidimensional color space representation of the printing device using a second constant value of the one or more of the plurality of colorants as an input to the calibration process, the second constant value of the one or more of the plurality of colorants offset from the first constant value of the one or more of the plurality of colorants, the second device dependent multidimensional color space representation defining a second gamut associated with the printing device;
   c) defining an effective gamut associated with the printing device formed by the intersection of the first gamut and second gamut;
   d) defining a third device dependent multidimensional color space representation of the printing device including only the first device dependent multidimensional color space representation of the printing device using the first constant value of one or more of the plurality of colorants within the effective gamut;
   e) defining a fourth device dependent multidimensional color space representation of the printing device including only the second device dependent multidimensional color space representation of the printing device using the second constant value of one or more of the plurality of colorants within the effective gamut;

f) generating a device dependent multidimensional color space representation of the image encoded with the watermark by encoding the watermark using a metameric pair of device dependent multidimensional color space representations of the image color associated with the watermark location, the metameric pair including a first metamer of the image color derived from the third device dependent multidimensional color space representation of the printing device to generate a first fixed infrared response and a second metamer of the image color derived from the fourth device dependent multidimensional color space representation of the printing device to generate a second fixed infrared response, whereby the differential infrared response of the metameric pair is substantially constant; and g) printing the device dependent multidimensional color space representation of the image encoded with the watermark on the substrate using the associated printing device.

2. The method according to claim 1, wherein the first constant value of one or more of the plurality of colorants is associated with a substantially black colorant K, and the second constant value of one or more of the plurality of colorants is associated with the substantially black colorant K offset from the first constant value.

3. The method according to claim 2, wherein the first constant value of K is within the range of 0-5%, and the second constant value of K is within the range of 20-35%.

4. The method according to claim 2, wherein K is associated with one of a black colorant and process black including a mixture of nonblack colorants.

5. The method according to claim 1, wherein the plurality of colorants are two or more of C (Cyan), M (Magenta), Y (Yellow), K (Black), O (Orange), V (Violet), R (Red), G (Green) and B (Blue).

6. The method according to claim 1, wherein the IR watermark is a barcode or other machine readable code.

7. The method according to claim 1, wherein the first, second, third and fourth device dependent multidimensional color space is CMYK.

8. The method according to claim 1, wherein the first and second device dependent multidimensional color space representation of the printing device transform from a trichromatic color space to CMYK color space.

9. A printing system comprising:
a printing device including a plurality of colorants, the printing device configured to receive device dependent data representative of an image encoded with an IR watermark and the printing device configured to print the image encoded with the IR watermark on a substrate; and
a controller operatively connected to the printing device, the controller configured to execute controller readable instructions to perform a method of printing an image encoded with an IR watermark on a substrate operatively associated with the printing device, the method comprising:
a) generating a device dependent multidimensional color space representation of the image encoded with the watermark; and
b) printing the device dependent multidimensional color space representation of the image encoded with the watermark on the substrate, wherein the device dependent multidimensional color space representation of the image encoded with the watermark is generated by a method comprising:

aa) generating a first device dependent multidimensional color space representation of the printing device using a first constant value of one or more of the plurality of colorants as an input to a calibration process, the first device dependent multidimensional color space representation defining a first gamut associated with the printing device;

bb) generating a second device dependent multidimensional color space representation of the printing device using a second constant value of the one or more of the plurality of colorants as an input to the calibration process, the second constant value of the one or more of the plurality of colorants offset from the first constant value of the one or more of the plurality of colorants, the second device dependent multidimensional color space representation defining a second gamut associated with the printing device;

cc) defining an effective gamut associated with the printing device formed by the intersection of the first gamut and second gamut;

dd) defining a third device dependent multidimensional color space representation of the printing device including only the first device dependent multidimensional color space representation of the printing device using the first constant value of one or more of the plurality of colorants within the effective gamut;

ee) defining a fourth device dependent multidimensional color space representation of the printing device including only the second device dependent multidimensional color space representation of the printing device using the second constant value of one or more of the plurality of colorants within the effective gamut; and ff) generating the device dependent multidimensional color space representation of the image encoded with the watermark by encoding the watermark using a metameric pair of device dependent multidimensional color space representations of the image color associated with the watermark location, the metameric pair including a first metamer of the image color derived from the third device dependent multidimensional color space representation of the printing device to generate a first fixed infrared response and a second metamer of the image color derived from the fourth device dependent multidimensional color space representation of the printing device to generate a second fixed infrared response, whereby the differential infrared response of the metameric pair is substantially constant.

10. The printing system according to claim 9, wherein the first constant value of one or more of the plurality of colorants is associated with a substantially black colorant K, and the second constant value of one or more of the plurality of colorants is associated with the substantially black colorant K offset from the first constant value.

11. The printing system according to claim 10, wherein the first constant value of K is within the range of 0-5%, and the second constant value of K is within the range of 20-35%.

12. The printing system according to claim 10, wherein K is associated with one of a black colorant and process black including a mixture of nonblack colorants.

13. The printing system according to claim 9, wherein the plurality of colorants are two or more of C (Cyan), M (Magenta), Y (Yellow), K (Black), O (Orange), V (Violet), R (Red), G (Green) and B (Blue).

14. The method according to claim 9, wherein the IR watermark is a barcode or other machine readable code.

15. The method according to claim 9, wherein the first, second, third and fourth device dependent multidimensional color space is CMYK.

16. The method according to claim 9, wherein the first and second device dependent multidimensional color space representation of the printing device transform from a trichromatic color space to CMYK color space.

17. A method of printing a first image not encoded with an IR watermark on a substrate, and printing a second image encoded with the IR watermark on the substrate, the substrate associated with a printing device including a plurality of colorants, the method comprising:
   a) generating a device dependent multidimensional color space representation of the first image not encoded with the watermark within a first gamut associated with the printing device;
   b) generating a device dependent multidimensional color space representation of the second image encoded with the IR watermark within a second gamut associated with the printing device, the second gamut a subset of the first gamut; and
   c) printing the device dependent multidimensional color space representation of the first image and second image on a common substrate,
   wherein step b) includes:
      aa) generating a first device dependent multidimensional color space representation of the printing device using a first constant value of one or more of the plurality of colorants as an input to a calibration process, the first device dependent multidimensional color space representation defining a first gamut associated with the printing device;
      bb) generating a second device dependent multidimensional color space representation of the printing device using a second constant value of the one or more of the plurality of colorants as an input to the calibration process, the second constant value of the one or more of the plurality of colorants offset from the first constant value of the one or more of the plurality of colorants, the second device dependent multidimensional color space representation defining a second gamut associated with the printing device;
      cc) defining an effective gamut associated with the printing device formed by the intersection of the first gamut and second gamut;
      dd) defining a third device dependent multidimensional color space representation of the printing device including only the first device dependent multidimensional color space representation of the printing device using the first constant value of one or more of the plurality of colorants within the effective gamut;
      ee) defining a fourth device dependent multidimensional color space representation of the printing device including only the second device dependent multidimensional color space representation of the printing device using the second constant value of one or more of the plurality of colorants within the effective gamut; and
      ff) generating the device dependent multidimensional color space representation of the image encoded with the watermark by encoding the watermark using a metameric pair of device dependent multidimensional color space representations of the image color associated with the watermark location, the metameric pair including a first metamer of the image color derived from the third device dependent multidimensional color space representation of the printing device to generate a first fixed infrared response and a second metamer of the image color derived from the fourth device dependent multidimensional color space representation of the printing device to generate a second fixed infrared response, wherein the differential infrared response of the metameric pair is substantially constant.

18. The method according to claim 17, wherein the first constant value of one or more of the plurality of colorants is associated with a substantially black colorant K, and the second constant value of one or more of the plurality of colorants is associated with the substantially black colorant K offset from the first constant value.

19. The method according to claim 18, wherein K is associated with one of a black colorant and process black including a mixture of nonblack colorants.

* * * * *